Sept. 11, 1962

C. E. POYNTER 3,053,148

HIGH SPEED SURFACE BROACHING MACHINE

Filed Dec. 2, 1958

INVENTOR
CYRIL E. POYNTER
BY

Sept. 11, 1962 C. E. POYNTER 3,053,148
HIGH SPEED SURFACE BROACHING MACHINE
Filed Dec. 2, 1958 3 Sheets-Sheet 3

INVENTOR
CYRIL E. POYNTER

United States Patent Office 3,053,148
Patented Sept. 11, 1962

3,053,148
HIGH SPEED SURFACE BROACHING MACHINE
Cyril Edward Poynter, Biggleswade, England, assignor to Weatherley Oilgear Limited, Biggleswade, Bedfordshire, England
Filed Dec. 2, 1958, Ser. No. 777,796
Claims priority, application Great Britain Nov. 9, 1954
7 Claims. (Cl. 90—10)

This invention relates to broaching machines and more particularly to high speed, heavy duty surface broaching machines.

As is well known in the art of surface broaching, the removal of a specified thickness of metal involves a working stroke of a certain minimum length, and where it is required to remove a considerable thickness, say, half an inch or more, a working stroke of at least several feet is necessary. Broaching machines having very long working strokes, whether such strokes are in vertical or horizontal direction, are difficult to house and are necessarily expensive in initial cost.

In order to increase the output of surface broaching machines and reduce the overall cost, it has previously been proposed to arrange them so as to work upon a workpiece during the movement of a broach bar in one direction and also to work again upon such workpiece during a reverse movement of the bar. This was accomplished years ago by providing the broach bar with two broach tools and a side shifting mechanism. At that time, a side shifting of the broach bar and tools was a practical expedient since the tools were relatively short in length and the machines operated at a relative tool to workpiece speed of 4–8 ft./min. Furthermore, there were large tolerances in the finished workpiece.

However, modern broaching machines operate at speeds of from 30–300 ft./min., and quite often the tolerances are as small as .003". The length of the stroke of broach tools are usually between 30–100". In these modern machines, it is often necessary in close tolerance work to limit the deviation of the tool over the length of its stroke to .0003". This highly restricted deviation is necessary for such pieces as turbine rotors and the restriction of deviation in run must not only be from left to right but also from front to back.

It is difficult enough to maintain this accuracy when long and rapid strokes are used even though the broach moves through only a straight line stroke. However, if complicated by a side shifting of the heavy broach bar, this accuracy is virtually impossible to maintain. When it is considered that a large modern broach tool for cutting the teeth of a 44 tooth involute spline in ring gears for truck rear axles having a 9⅜₆ inch outside diameter and 84¾ inch long, weighs about one half ton, it will be realized that the above statement is no exaggeration.

If two side by side broaching tools are used so as to cut on both the up and the down stroke of the machine, it is obvious that with the same power driving the tools on each stroke, the down stroke will apply more force because of the weight of gravity accompanying it and thus allow a more positive support to be given to the work. On the old type of machines no distinction was made between the strokes and the result was uneven broaching strokes being obtained on the workpiece which decreased the efficiency of the operation. Moreover, in these prior machines which attempted to perform a cutting action on both strokes of the tool, the work was fixed and the broach tool was moved through a rectilinear movement which made for a more complicated and less accurately aligned drive and guide mechanism.

Having in mind the defects of the prior art apparatus, it is the primary object of the present invention to provide a high-speed, heavy duty surface broaching machine having great accuracy.

Another object of the invention is to provide a high-speed, heavy duty surface broaching machine which is smaller and more compact, and therefore less costly than known machines of similar operation and capability.

Still another object of the invention is to provide a surface broaching machine which cuts on both strokes of the tool but in which the tool moves only in a linear path.

A further object of the invention is to provide a surface broaching machine wherein the tool effects a rough broaching on the up stroke and a finished broaching on the down stroke.

A still further object of the invention is to provide a high-speed, heavy duty surface broaching machine having simplicity of design, economy of construction, and efficiency in operation.

Briefly, according to the present invention, a surface broaching machine is provided with a work table for holding at least one workpiece, a broach bar drivable on both forward and reverse strokes, at least one pair of broach tools secured to the bar in parallel relation with the teeth of one tool oppositely disposed to those of the other tool, and means for shifting the said work table transversely of the stroke of the bar to bring the workpiece into operative relationship with one tool on a forward stroke of the bar and with the other tool on a reverse stroke of the bar. In the use of machines according to the invention, a workpiece remains clamped in position on a single work table while it is broached by tools first from one direction and then from the opposite direction. In this way, it is possible approximately to halve the strokes which normally are necessary to remove a commensurate amount of metal from a workpiece. In the case of a vertically movable broach bar, the tools preferably are arranged to perform the initial rough cut on the work on an upward stroke, and the finishing cut on a downward stroke when the most positive support can more easily be given to the work.

This application is a continuation in part of my application Serial No. 544,282 filed November 1, 1955, now abandoned.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1:
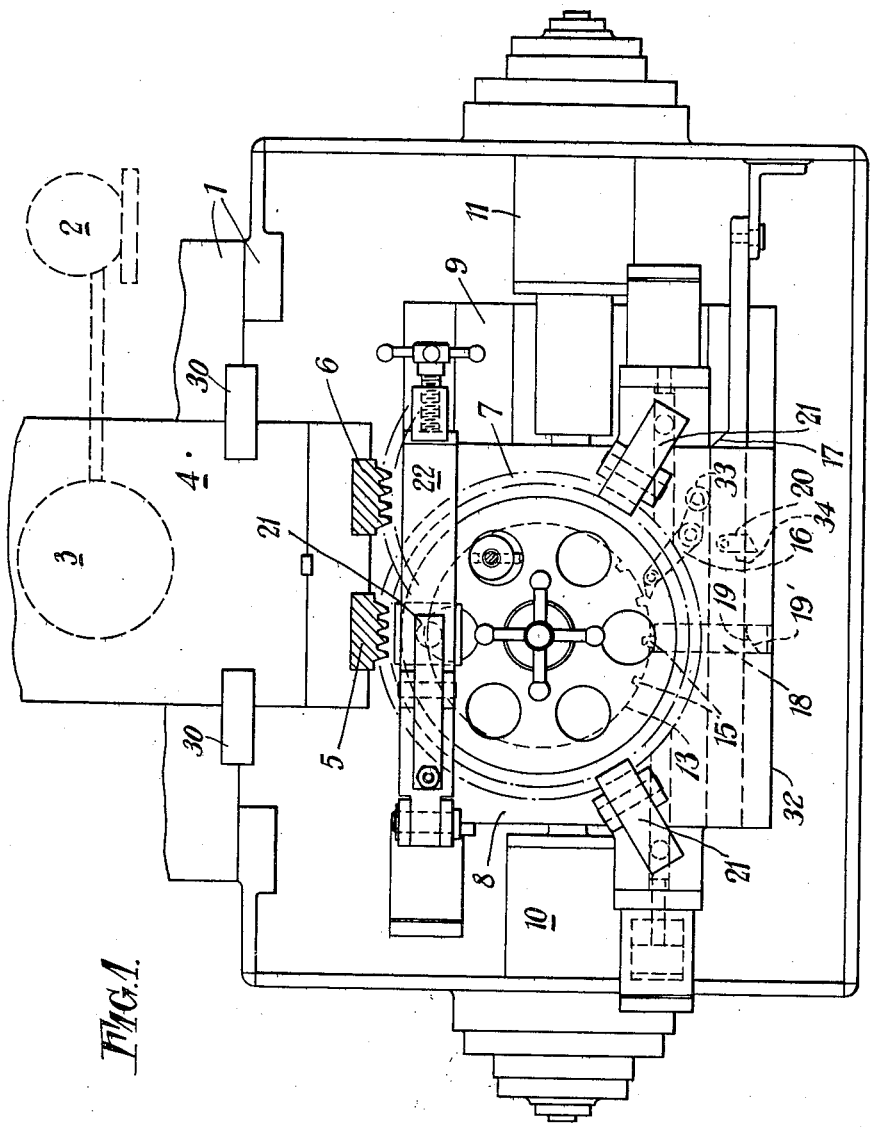
FIG. 1 is a plan view of the work table and part of the slide of the machine.

The machine to be described is particularly designed for cutting gear teeth in the rim of a wheel and for this reason, it is fitted with a rotatable work table which can be indexed automatically on completion of each double stroke cutting operation, but it will be clear to those skilled in the art that this is but one of many applications of the principles of the invention.

The machine has a fabricated frame 1 of conventional construction, a hydraulic pump 2 connected to a double acting hydraulic ram 3, a broach bar or tool slide 4 connected to the ram 3 and conventional hydraulic and electric control gear (not shown) for controlling the operation of the ram. The slide 4 is mounted on tracks 30 fixed to the frame for vertical sliding movement relative to frame 1.

The broach bar 4 carries two sets of broach tools 5 and 6 lying parallel to the axis of its stroke and spaced apart by a few inches. The teeth on the set of tools 5 are arranged to perform a comparatively coarse cut on an upward stroke of the bar 4 and the teeth on the other set of tools 6 are arranged to perform a finer cut on a downward stroke of the bar. There are four aligned rows of teeth in each set of tools, adapted between them to form three gear teeth on a wheel rim 7 which constitutes a workpiece.

Figure 3:
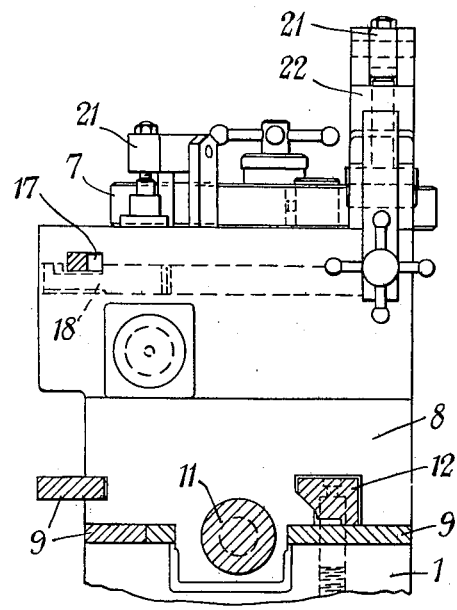
FIG. 3 is a side elevational view of the work table shown in the other figures with parts shown in section.

A work table 32 for holding the workpiece has a main body 8 mounted on slideways 9 fixed to the machine frame 1. The table is shiftable by hydraulic rams 10 and 11, or other means, transversely of the stroke of the bar 4 through a distance equal to the transverse spacing between the sets of tools 5 and 6. Hydraulically operated clamps 12 (FIG. 3) are provided to lock the table 8 in either one of its alternate positions, which positions bring the workpiece into operative relationship with one or other of the sets of tools 5 and 6.

Figure 2:
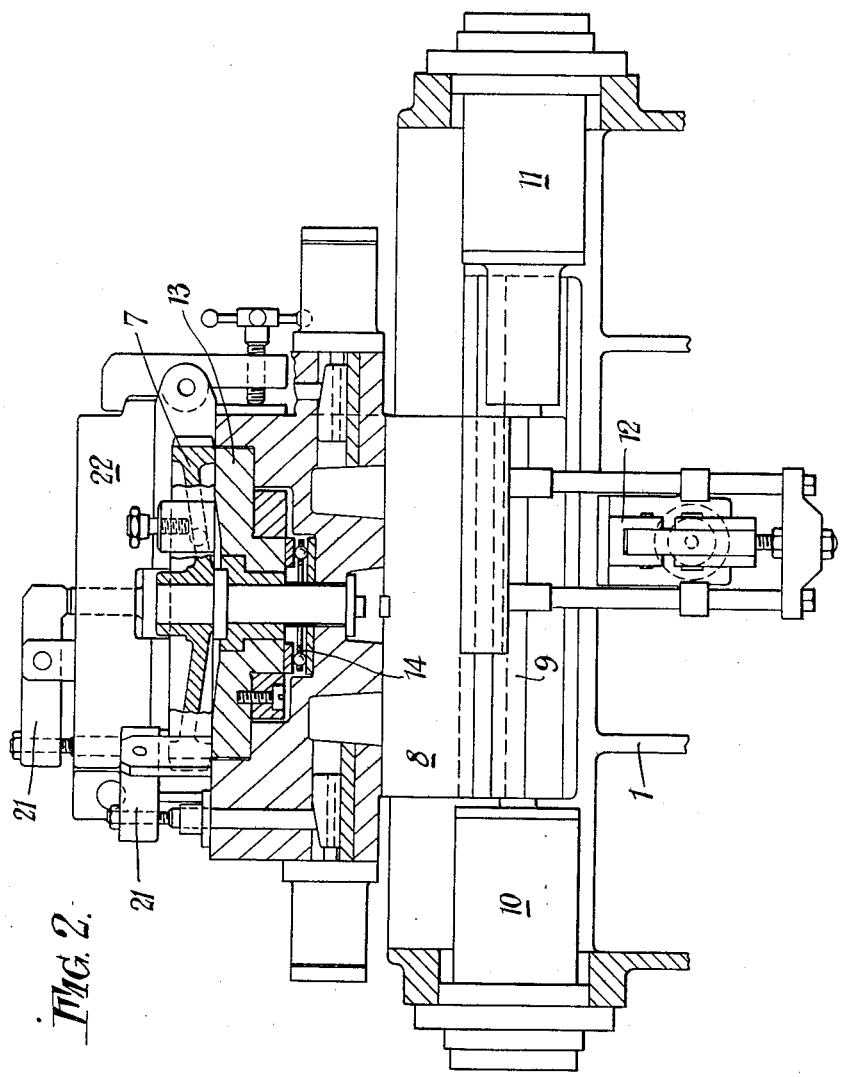
FIG. 2 is a front elevational view of the work table shown in FIG. 1 with parts shown in section.

The workpiece 7 is carried on a subsidiary body or support 13 (FIG. 2) of the work table which is rotatably mounted on the main body 8 and supported on a suitable thrust bearing 14. This subsidiary body or support 13 is circular in plan and is provided with a series of notches 15 in its circumference. The arcuate spacing of the notches 15 corresponds to a rotation of the workpiece 7 sufficient to bring an unmachined portion into operative position in the path of the first set of broach tools 5. A pivoted arm member 16 is operated by means of a cam 17 fixed to the frame 1 to engage a notch 15 and rotate the subsidiary body or support 13 every time the work table 8 is shifted from the position in front of the second set of broach tools 6 to the position in front of the first set of broach tools 5.

A latch member 18 having a projecting thickened portion 19' has a cam face 19 thereon and is operated by a swivel cam 20 fixed to the frame 1 to be released from one and reengaged in another of the notches 15 before and after each partial rotation of the subsidiary body or support 13. Three hydraulically operated clamping members 21, one of which operates through a hinged clamping bridge 22, are automaticaly controlled to release and reclamp the workpiece 7 during and after each rotation thereof.

In the operation of the machine, the wheel rim 7, constiuting the workpiece is located and clamped in the subsidiary body or support 13 of the work table 8. The broach bar 4 is at this time at the bottom of its stroke and the work table 8 is in a position presenting an unworked portion of the wheel rim 7 in operative position above the first set of broach tools 5. An upward stroke of the ram 3 and broach bar 4 now takes place and three teeth are roughly formed on the rim by the comparatively coarse cut broach tool 5. The work table 8 is then shifted (by the ram 10) transversely of the stroke of the bar 4 to bring the roughly formed teeth into operative position below the second set of broach tools 6. During this movement, projection 19' moves to the other side of swivel cam 20 which freely swings in a counterclockwise direction as viewed in FIG. 1 to permit the projection to move. When the table 8 reaches the end of its stroke, a roller 33, urged against cam 17, engages the lower portion of the cam so that the end of arm 16 engages a notch 15. A downward stroke is now performed by the bar 4 and a lighter finishing cut brings the three roughly cut teeth to finished shape. The three hydraulic clamps 21 are released at this time.

As the table is shifted back again by the ram 11 to its initial position above the first set of broach tools 5, the latch member 18 holding the subsidiary body or support 13 of the table 8 is released on contact with the swivel cam 20 which engages a stop 34, and the subsidiary body 13 is indexed around by the pivoted arm 16 contacting the fixed cam 17 which moves to the wider portion of the cam 17 and moves arm 16 counterclockwise as viewed in FIG. 1.

The hydraulic clamps 21 are again operated to fix the workpiece 7 firmly in its new position and the two cutting strokes are repeated as described above. It will be appreciated that there is no unclamping of the workpiece during the two working strokes required to finish a particular broaching operation and that the whole broaching machine can be about half the size of a conventional machine performing a commensurate operation.

For a highly accurate broaching job, that is one which demands an accuracy of .003", the long run of the shuttling broach slide of the prior art could not provide such accuracy, especially as the travel of the broach bar is likely to be about 4 feet. In the present invention, the movement of the work holder or table 8 is only a few inches. In modern broaching, it is essential that the vertical slide of the machine should have only .0003" deviation in the whole of its travel, and the travel may be anything from 30" to 100". This deviation is necessary for such workpieces as turbine rotors and the deviation in run must be from left to right and also from front to back. The slide of the prior art, in which the broach bar is moved from right to left, could not meet anything like this accuracy. The present invention aligns the broach slide to .0003" both ways and, once adjusted and set, it is not upset by any mechanism across movement of the mass of metal. The only movement in the present invention is the few inches travel of the work table 8 which is of small mass and can be done with ease and to a high degree of accuracy.

Although a certain specific embodiment of the invention has been shown and described, it is obvious that many modifications thereof are possible. The invention, therefore, is not to be restricted except insofar as is necessitated by the prior art and by the spirit of the appended claims.

I claim:

1. A broaching machine for cutting gear teeth in the rim of a wheel comprising a frame, a double acting ram on the frame, a broach bar mounted on the frame for reciprocal linear movement by the ram, a plurality of tool supports closely spaced transversely of said bar, a pair of broach tools secured to the bar by said supports, each tool having a plurality of teeth to cut a corresponding number of gear teeth in the rim, slideways fixed to the frame, a work table mounted on said slideways, a subsidiary circular body rotatably mounted on said work table and fixedly supporting the wheel, power means for moving said table and wheel transversely of the stroke of the broach bar through a distance equal to the transverse spacing between the broach tools to bring the rim of the wheel into operative relationship to one tool on a forward stroke of the bar and with another tool on a reverse stroke of the bar, means for rotatively moving the subsidiary circular body and wheel through a predetermined angle on completion of each double stroke by the broach bar when the table is brought to its initial position, a thrust bearing supporting the subsidiary body, a plurality of notches spaced along the circumference of said subsidiary body corresponding to the rotation of the wheel sufficient to bring an unmachined part of the wheel into operative position in the path of a broaching tool, and cam means fixed to the frame to engage a notch and rotate the subsidiary body every time the work table is shifted from the position in front of the second broach tool to the position in front of the first broach tool.

2. A broaching machine for cutting gear teeth in the rim of a wheel comprising a frame, driving means on the frame, a broach bar mounted on the frame for reciprocal linear movement only by said driving means, a plurality of tool supports closely spaced transversely of said bar, a pair of broach tools secured to the bar by said supports, each tool having a plurality of teeth to cut a corresponding number of gear teeth in the rim, slideways fixed to the frame, a work table mounted on said slideways, a subsidiary circular body rotatably mounted on said work table for fixedly supporting a wheel, power means for moving said table transversely of the stroke of the broach bar through a distance equal to the transverse spacing between the broach tools to bring the rim of the wheel into operative relationship to one tool on a forward stroke of the bar and with another tool on a reverse stroke of the bar, cam means for rotatively moving the subsidiary circular body through a predetermined angle on completion on each double stroke by the broach bar when the table is brought to its initial position, said teeth of one tool being oppositely disposed to the teeth of the other tool, and said tools being arranged so that a rough cut on the rim of the wheel is performed on an upward stroke and that a finish cut is performed on a downward stroke.

3. A surface broaching machine comprising a frame, rectilinear slideways fixed on said frame, a work table slidably mounted on said slideways and guided thereby for the full distance between spaced work positions, means for adjustably holding a workpiece on said table, a broach bar mounted for reciprocal linear movement only in a direction perpendicular to the movement of the work table, at least one guide member presenting at least two surfaces slidably engaging said broach bar and extending parallel to and for the full length of movement of said broach bar, means for driving said bar on both forward and reverse strokes, a plurality of tool supports on said bar for respectively supporting a broach tool longitudinally of said bar and closely spaced transversely of said bar, at least a pair of broach tools secured to the bar by said supports and with the teeth of one tool oppositely disposed to those of the other tool, coarse cutting teeth on one tool being arranged to perform a cut on the forward stroke of the bar away from the table and finish cutting teeth on the other tool being arranged to perform a cut on the reverse stroke of the bar toward said table, and power means for shifting the table with the workpiece transversely of the stroke of the bar a distance substantially equal to the transverse spacing between said tool supports to bring the same part of the workpiece into operative relationship to one tool support on a forward stroke of the bar and with another tool support on a reverse stroke of the bar.

4. A broaching machine as set forth in claim 3 wherein the broach bar is arranged for linear vertical movement only and the said table is arranged for horizontal movement only.

5. The broaching machine of claim 3 wherein said means for adjustably holding a workpiece on the table includes means operable to shift the workpiece angularly to present a different surface portion into position to be worked on by said pair of broaches.

6. The broaching machine of claim 5 wherein said means operable to shift the workpiece angularly comprises a body rotatably mounted on said work table and to which the workpiece is clamped.

7. The broaching machine of claim 3 wherein said means for driving the broach bar is a double acting ram.

References Cited in the file of this patent

UNITED STATES PATENTS

| | | |
|---|---|---|
| 1,684,140 | Perkins et al. | Sept. 11, 1928 |
| 2,072,563 | Lynch et al. | Mar. 2, 1937 |
| 2,371,053 | LaPointe et al. | Mar. 6, 1945 |

FOREIGN PATENTS

| | | |
|---|---|---|
| 4,640 | Great Britain | Feb. 6, 1907 |